(12) United States Patent
Kumar

(10) Patent No.: US 12,219,540 B2
(45) Date of Patent: Feb. 4, 2025

(54) SYSTEMS AND METHODS TO INCLUDE DEMODULATION REFERENCE SIGNAL BUNDLING IN MULTI-SUBSCRIBER IDENTITY MODULE DEVICES

(71) Applicant: QUALCOMM Incorporated, San Diego, CA (US)

(72) Inventor: Akash Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 17/661,173

(22) Filed: Apr. 28, 2022

(65) Prior Publication Data

US 2023/0354279 A1 Nov. 2, 2023

(51) Int. Cl.
*H04W 72/0453* (2023.01)
*H04W 8/18* (2009.01)

(52) U.S. Cl.
CPC ....... *H04W 72/0453* (2013.01); *H04W 8/183* (2013.01)

(58) Field of Classification Search
CPC .... H04L 5/001; H04L 5/0051; H04W 60/005; H04W 72/0453; H04W 8/183; H04W 8/24; H04W 88/06
See application file for complete search history.

(56) References Cited

U.S. PATENT DOCUMENTS

| | | | |
|---|---|---|---|
| 8,934,460 B1 | 1/2015 | Hu et al. | |
| 9,031,066 B2 * | 5/2015 | Hong | H04W 88/06 370/388 |
| 9,374,786 B1 * | 6/2016 | Maheshwari | H04W 52/0251 |
| 10,237,841 B1 * | 3/2019 | Krishnamurthy | H04W 76/38 |
| 11,503,615 B2 * | 11/2022 | Hu | H04W 72/0446 |
| 2009/0245213 A1 * | 10/2009 | Zaki | H04W 72/0446 370/336 |
| 2013/0237257 A1 * | 9/2013 | Walke | H04W 68/00 455/458 |

(Continued)

FOREIGN PATENT DOCUMENTS

| | | |
|---|---|---|
| EP | 3016455 A1 | 5/2016 |
| WO | 2021035458 A1 | 3/2021 |

OTHER PUBLICATIONS

Partial International Search Report—PCT/US2023/013907—ISA/EPO—May 16, 2023.

(Continued)

*Primary Examiner* — Dung B Huynh
(74) *Attorney, Agent, or Firm* — QUALCOMM Incorporated

(57) ABSTRACT

A method of wireless communication performed by a user equipment (UE) includes: operating in a dual SIM dual active (DSDA) mode with respect to a first subscriber identity module (SIM) and a second SIM; controlling transmit operations of the first SIM and the second SIM according to a time division multiplexed (TDM) priority pattern; performing demodulation reference signal (DMRS) bundling on the first SIM, the first SIM having a higher priority state according to the TDM priority pattern; and deferring a priority switch to give the higher priority state to the second SIM until after the first SIM has completed a repetition of DMRS bundling.

17 Claims, 10 Drawing Sheets

(56) References Cited

U.S. PATENT DOCUMENTS

| | | | |
|---|---|---|---|
| 2014/0213235 A1* | 7/2014 | Lou | H04B 1/525 455/418 |
| 2015/0023217 A1* | 1/2015 | Hu | H04W 88/06 370/259 |
| 2015/0080008 A1* | 3/2015 | Ngai | H04W 88/06 455/452.2 |
| 2015/0139015 A1* | 5/2015 | Kadous | H04W 36/0085 370/252 |
| 2015/0245309 A1* | 8/2015 | Nayak | H04W 8/183 455/435.3 |
| 2015/0264602 A1* | 9/2015 | Hageltorn | H04W 72/541 455/436 |
| 2015/0289314 A1* | 10/2015 | Yang | H04J 3/17 455/552.1 |
| 2015/0296520 A1* | 10/2015 | Batchu | H04W 48/16 455/434 |
| 2015/0327159 A1* | 11/2015 | Gude | H04W 48/18 455/434 |
| 2015/0327329 A1* | 11/2015 | Zhou | H04W 88/06 455/553.1 |
| 2015/0334574 A1* | 11/2015 | Krishnamoorthy | H04W 72/0453 370/329 |
| 2015/0349869 A1* | 12/2015 | Sun | H04B 7/0871 455/132 |
| 2015/0382361 A1* | 12/2015 | Sabapathi | H04L 5/0073 370/329 |
| 2016/0007312 A1* | 1/2016 | Cherry | H04W 8/183 455/435.3 |
| 2016/0007370 A1* | 1/2016 | Kotreka | H04W 88/06 370/329 |
| 2016/0021520 A1* | 1/2016 | Gudu Gantla | H04W 4/90 455/404.1 |
| 2016/0050686 A1* | 2/2016 | Krishnamoorthi | H04W 28/04 455/418 |
| 2016/0094316 A1* | 3/2016 | Fanous | H04L 1/1812 370/329 |
| 2016/0095157 A1* | 3/2016 | Wenzel | H04W 76/28 370/329 |
| 2016/0174232 A1* | 6/2016 | Krishnamoorthy | H04B 1/1027 455/452.2 |
| 2016/0204908 A1* | 7/2016 | Rafique | H04W 24/08 370/252 |
| 2016/0219608 A1* | 7/2016 | Awoniyi-Oteri | H04W 72/1215 |
| 2016/0219648 A1* | 7/2016 | Awoniyi-Oteri | H04W 8/24 |
| 2016/0227557 A1* | 8/2016 | Fanous | H04W 72/56 |
| 2016/0315744 A1* | 10/2016 | Choi | H04L 5/0055 |
| 2017/0026985 A1* | 1/2017 | Lindoff | H04W 72/1215 |
| 2017/0048855 A1* | 2/2017 | Garg | H04W 48/16 |
| 2017/0064762 A1* | 3/2017 | Ramasamy | H04W 12/106 |
| 2017/0071021 A1* | 3/2017 | Jin | H04W 76/15 |
| 2017/0118737 A1* | 4/2017 | Batchu | H04W 68/005 |
| 2017/0164398 A1* | 6/2017 | Rajaee | H04W 88/06 |
| 2017/0171902 A1* | 6/2017 | Tillman | H04W 76/16 |
| 2017/0265114 A1* | 9/2017 | Sahu | H04L 65/1069 |
| 2018/0139788 A1* | 5/2018 | Jhunjhunwala | H04W 76/50 |
| 2018/0146365 A1* | 5/2018 | Dhanapal | H04W 8/183 |
| 2018/0160422 A1* | 6/2018 | Pathak | H04W 76/10 |
| 2018/0324595 A1* | 11/2018 | Shima | H04B 7/0413 |
| 2019/0090280 A1* | 3/2019 | Krishnamoorthy | H04W 72/21 |
| 2019/0098597 A1* | 3/2019 | Basu Mallick | H04W 88/06 |
| 2019/0132090 A1* | 5/2019 | Jarrahi Khameneh | H04L 1/1812 |
| 2019/0166534 A1* | 5/2019 | Williammee | H04W 36/322 |
| 2019/0174361 A1* | 6/2019 | Fu | H04W 72/0453 |
| 2019/0222380 A1* | 7/2019 | Manolakos | H04L 25/0224 |
| 2019/0349760 A1* | 11/2019 | Fong | H04L 27/0006 |
| 2020/0045615 A1* | 2/2020 | Karimli | H04W 48/08 |
| 2020/0170063 A1* | 5/2020 | Hu | H04W 72/0453 |
| 2020/0196192 A1* | 6/2020 | Fazel Sarjoui | H04W 28/0252 |
| 2020/0245233 A1* | 7/2020 | Qian | H04W 48/18 |
| 2020/0382968 A1* | 12/2020 | Gupta | H04L 41/145 |
| 2021/0014095 A1* | 1/2021 | Ly | H04L 5/0094 |
| 2021/0014666 A1* | 1/2021 | Baskar | H04W 52/365 |
| 2021/0014667 A1* | 1/2021 | Lovlekar | H04W 88/06 |
| 2021/0029773 A1* | 1/2021 | Majumder | H04W 8/183 |
| 2021/0076438 A1* | 3/2021 | Lee | H04W 8/245 |
| 2021/0089026 A1* | 3/2021 | Bender | H04W 72/542 |
| 2021/0105606 A1* | 4/2021 | Bendlin | H04W 60/005 |
| 2021/0105740 A1* | 4/2021 | Huang | H04W 88/02 |
| 2021/0105791 A1* | 4/2021 | Wang | H04W 72/20 |
| 2021/0204300 A1* | 7/2021 | Hu | H04B 7/18513 |
| 2021/0226833 A1* | 7/2021 | Park | H04W 72/0453 |
| 2021/0243632 A1* | 8/2021 | Pezeshki | H04W 80/02 |
| 2021/0282103 A1* | 9/2021 | Zhu | H04W 76/15 |
| 2021/0282206 A1* | 9/2021 | Zhu | H04L 5/0023 |
| 2021/0345432 A1* | 11/2021 | Yang | H04W 8/20 |
| 2021/0409133 A1* | 12/2021 | Pezeshki | H04W 24/10 |
| 2022/0007363 A1* | 1/2022 | Wang | H04W 72/0453 |
| 2022/0039047 A1* | 2/2022 | Tsai | H04W 8/24 |
| 2022/0069873 A1* | 3/2022 | Gopal | H04B 7/0469 |
| 2022/0116161 A1* | 4/2022 | Jones | H04L 5/0041 |
| 2022/0123889 A1* | 4/2022 | Levitsky | H04L 5/0012 |
| 2022/0124544 A1* | 4/2022 | Jha | H04W 76/10 |
| 2022/0132612 A1* | 4/2022 | Chang | H04W 76/15 |
| 2022/0132613 A1* | 4/2022 | Chang | H04L 5/1469 |
| 2022/0141720 A1* | 5/2022 | Jha | H04W 8/183 455/436 |
| 2022/0182906 A1* | 6/2022 | Bettappanavar | H04W 8/183 |
| 2022/0201678 A1* | 6/2022 | Chang | H04W 72/1215 |
| 2022/0210856 A1* | 6/2022 | Zhang | H04W 76/38 |
| 2022/0225240 A1* | 7/2022 | Fakoorian | H04W 72/21 |
| 2022/0225322 A1* | 7/2022 | Shim | H04L 1/08 |
| 2022/0240079 A1* | 7/2022 | Lovlekar | H04W 68/12 |
| 2022/0248259 A1* | 8/2022 | Lei | H04L 47/522 |
| 2022/0256410 A1* | 8/2022 | Zhang | H04W 76/19 |
| 2022/0272688 A1* | 8/2022 | Lee | H04W 72/563 |
| 2022/0278728 A1* | 9/2022 | Vankayala | H04B 7/0417 |
| 2022/0286839 A1* | 9/2022 | Zhao | H04W 76/16 |
| 2022/0286994 A1* | 9/2022 | Singh | H04W 24/04 |
| 2022/0295445 A1* | 9/2022 | Göktepe | H04W 68/02 |
| 2022/0303869 A1* | 9/2022 | Paradkar | H04W 76/15 |
| 2022/0303937 A1* | 9/2022 | Wu | H04W 8/20 |
| 2022/0312347 A1* | 9/2022 | Cherian | H04B 17/318 |
| 2022/0322476 A1* | 10/2022 | Li | H04W 72/569 |
| 2022/0338258 A1* | 10/2022 | Xie | H04W 74/0816 |
| 2022/0361132 A1* | 11/2022 | Gurumoorthy | H04W 60/005 |
| 2022/0369211 A1* | 11/2022 | Agiwal | H04W 48/16 |
| 2022/0369246 A1* | 11/2022 | Lin | H04W 52/367 |
| 2022/0377658 A1* | 11/2022 | Gudivada | H04W 48/16 |
| 2022/0386151 A1* | 12/2022 | Eger | H04W 24/04 |
| 2022/0394605 A1* | 12/2022 | Wang | H04W 48/18 |
| 2022/0394712 A1* | 12/2022 | Shahi | H04W 24/02 |
| 2022/0408328 A1* | 12/2022 | Adjakple | H04W 36/0061 |
| 2022/0418020 A1* | 12/2022 | Adjakple | H04W 72/1215 |
| 2023/0007624 A1* | 1/2023 | Murray | H04W 68/005 |
| 2023/0010736 A1* | 1/2023 | Hebein | H04W 36/0058 |
| 2023/0011024 A1* | 1/2023 | Hebein | H04W 48/16 |
| 2023/0037290 A1* | 2/2023 | Taherzadeh Boroujeni | H04W 72/0446 |
| 2023/0047213 A1* | 2/2023 | Chen | H04W 76/27 |
| 2023/0048785 A1* | 2/2023 | Ngai | H04W 76/15 |
| 2023/0057052 A1* | 2/2023 | Elshafie | H04L 5/0048 |
| 2023/0068437 A1* | 3/2023 | Narayanan | H04W 24/02 |
| 2023/0075568 A1* | 3/2023 | Kanneath Abraham | H04W 24/10 |
| 2023/0088766 A1* | 3/2023 | Qin | H04B 17/318 370/329 |
| 2023/0091739 A1* | 3/2023 | Sabouri-Sichani | H04W 72/0453 370/329 |
| 2023/0108535 A1* | 4/2023 | Sridharan | H04L 5/0044 370/329 |
| 2023/0117026 A1* | 4/2023 | Gopal | H04W 12/45 370/329 |
| 2023/0122569 A1* | 4/2023 | Sriram | H04W 60/04 455/458 |
| 2023/0171828 A1* | 6/2023 | Wang | H04W 52/367 370/329 |

(56) References Cited

U.S. PATENT DOCUMENTS

| | | | |
|---|---|---|---|
| 2023/0179369 A1* | 6/2023 | Xu | H04L 5/0094 370/336 |
| 2023/0180170 A1* | 6/2023 | Shukair | H04W 8/183 370/329 |
| 2023/0199565 A1* | 6/2023 | Vannithamby | H04W 24/10 370/229 |
| 2023/0199602 A1* | 6/2023 | Li | H04W 36/0069 370/331 |
| 2023/0216711 A1* | 7/2023 | Yao | H04L 5/0051 370/328 |
| 2023/0239802 A1* | 7/2023 | Kumar | H04W 52/262 370/318 |
| 2023/0254918 A1* | 8/2023 | Gurumoorthy | H04W 8/24 455/435.1 |
| 2023/0262446 A1* | 8/2023 | Kim | H04W 76/30 455/422.1 |
| 2023/0262452 A1* | 8/2023 | Yao | H04W 8/22 370/328 |
| 2023/0262635 A1* | 8/2023 | Tan | H04W 56/0045 370/350 |
| 2023/0269636 A1* | 8/2023 | Lee | H04W 36/305 370/331 |
| 2023/0269818 A1* | 8/2023 | Zhang | H04W 72/1268 370/329 |
| 2023/0276249 A1* | 8/2023 | Tang | H04W 72/0453 370/329 |
| 2023/0276522 A1* | 8/2023 | Ghelichi | H04W 52/24 370/329 |
| 2023/0284308 A1* | 9/2023 | Prabhakar | H04W 76/16 370/329 |
| 2023/0291523 A1* | 9/2023 | Hasegawa | H04L 5/0094 |
| 2023/0299798 A1* | 9/2023 | Zhang | H04B 1/005 455/552.1 |
| 2023/0308855 A1* | 9/2023 | Matolia | H04W 4/50 |
| 2023/0337202 A1* | 10/2023 | Pant | H04L 5/0053 |
| 2023/0345416 A1* | 10/2023 | Chin | H04W 68/02 |
| 2023/0354279 A1* | 11/2023 | Kumar | H04W 72/0453 |
| 2023/0361960 A1* | 11/2023 | Yu | H04L 5/0023 |
| 2023/0370833 A1* | 11/2023 | Zhang | H04B 7/0802 |
| 2023/0397079 A1* | 12/2023 | Mattam | H04W 8/22 |
| 2024/0007843 A1* | 1/2024 | Shen | H04B 17/328 |
| 2024/0008011 A1* | 1/2024 | Yu | H04L 1/18 |
| 2024/0008090 A1* | 1/2024 | Ly | H04W 74/0833 |
| 2024/0023077 A1* | 1/2024 | Yajnanarayana | H04W 72/56 |
| 2024/0023080 A1* | 1/2024 | Wei | H04L 5/0051 |
| 2024/0032124 A1* | 1/2024 | Peddiraju | H04L 5/0098 |
| 2024/0048338 A1* | 2/2024 | Zachrison | H04L 5/001 |
| 2024/0073772 A1* | 2/2024 | Gupta | H04W 76/12 |
| 2024/0098478 A1 | 3/2024 | Kumar | |
| 2024/0098522 A1 | 3/2024 | Kumar | |
| 2024/0098771 A1* | 3/2024 | Liu | H04W 72/541 |
| 2024/0121146 A1* | 4/2024 | Nielsen | H04B 1/06 |
| 2024/0163011 A1* | 5/2024 | Hasegawa | H04L 1/0071 |
| 2024/0163135 A1* | 5/2024 | Liu | H04L 25/0228 |
| 2024/0179658 A1* | 5/2024 | Zou | H04W 56/0015 |
| 2024/0187281 A1* | 6/2024 | Qiao | H04L 1/08 |
| 2024/0187898 A1* | 6/2024 | Sabouri-Sichani | H04W 24/10 |
| 2024/0188067 A1* | 6/2024 | Zhang | H04W 72/21 |
| 2024/0188075 A1* | 6/2024 | Tran | H04L 5/0048 |
| 2024/0188174 A1* | 6/2024 | Jung | H04W 76/38 |
| 2024/0214869 A1* | 6/2024 | Sha | H04W 28/0268 |
| 2024/0215101 A1* | 6/2024 | Gurumoorthy | H04W 8/183 |
| 2024/0243958 A1* | 7/2024 | Wang | H04W 72/40 |

OTHER PUBLICATIONS

Qualcomm Incorporated: "Handling of CA for DMRS Bundling", 3GPP TSG-RAN WG4 Meeting #103-e, R4-2210215, 3rd Generation Partnership Project, Mobile Competence Centre, 650, Route Des Lucioles, F-06921 Sophia-Antipolis Cedex, France, vol. RAN WG4, No. 20220501, Apr. 25, 2022, XP052143732, 5 pages, p. 2.
International Search Report and Written Opinion—PCT/US2023/013907—ISA/EPO—Jul. 3, 2023.
Moderator (NTT Docomo), et al., "Summary on UE Features for NR Coverage Enhancement", 3GPP TSG RAN WG1 #106bis-e, R1-2109714, 3rd Generation Partnership Project, Mobile Competence Centre, 650, Route Des Lucioles, F-06921 Sophia-Antipolis Cedex, France, vol. RAN WG1, No. e-Meeting, Oct. 11, 2021-Oct. 19, 2021, Oct. 19, 2021, XP052062113, 40 pages, p. 21.
Moderator (Qualcomm): "FL summary # 4 of PUCCH Coverage Enhancement", 3GPP TSG RAN WG1 #106-e, R1-2108619, 3rd Generation Partnership Project (3GPP), Mobile Competence Centre, 650, Route Des Lucioles, F-06921 Sophia-Antipolis Cedex, France, vol. RAN WG1, No. e-Meeting, Aug. 16, 2021-Aug. 27, 2021, XP052042727, p. 24, pp. 1-37.

* cited by examiner

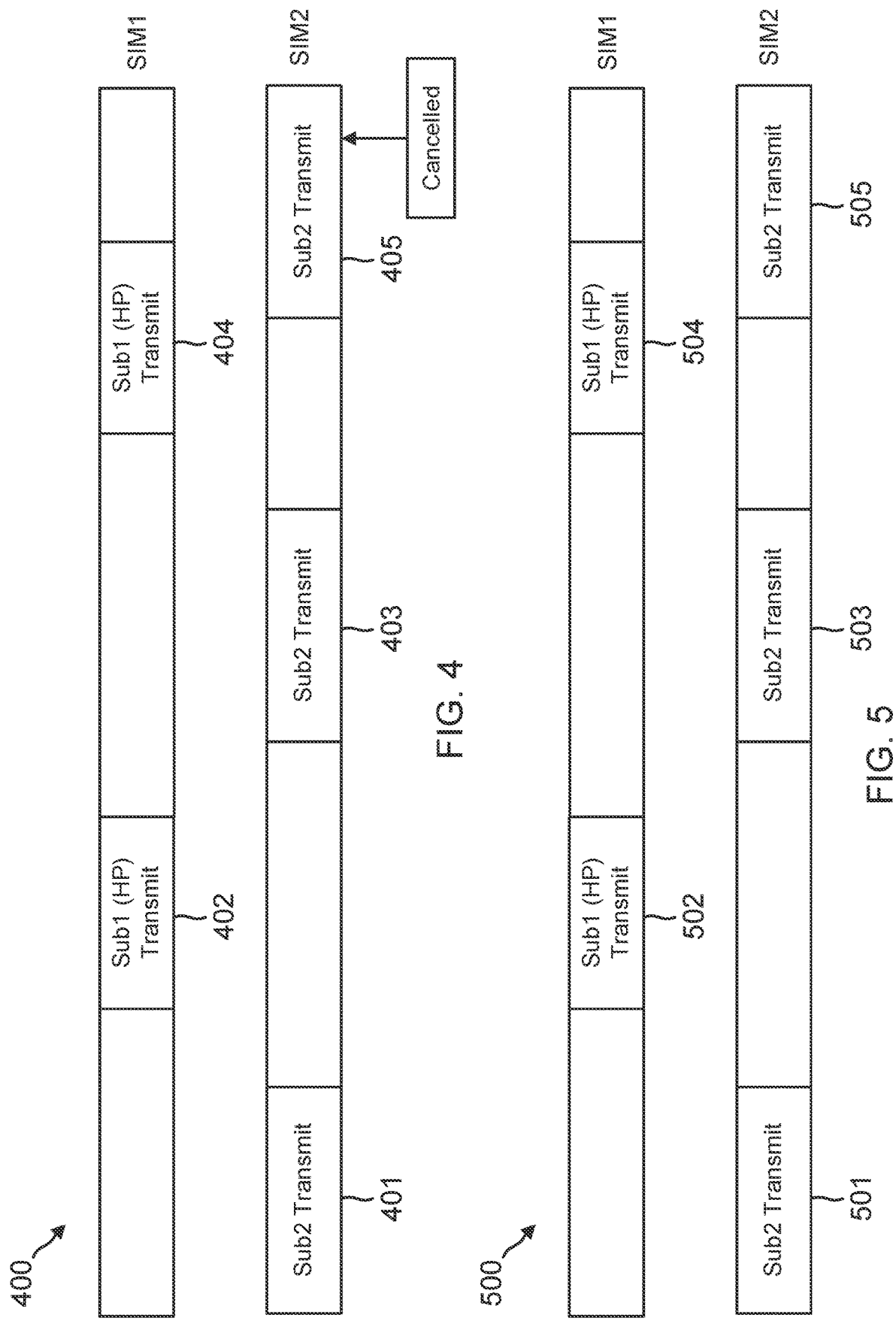

SYSTEMS AND METHODS TO INCLUDE DEMODULATION REFERENCE SIGNAL BUNDLING IN MULTI-SUBSCRIBER IDENTITY MODULE DEVICES

TECHNICAL FIELD

This application relates to wireless communication systems, and more particularly improving throughput when using demodulation reference signal (DMRS) bundling in multi-subscriber identity module (multi-SIM) devices.

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Furthermore, as wireless communication becomes cheaper and more reliable, expectations among consumers change. Some UE manufacturers are responding to consumer preferences by including multiple subscriber identity modules (SIMs) within UEs.

However, including multiple SIMs within a device may lead to scenarios in which activities by one SIM may interfere with or preclude activities by the other SIM. There is a need in the art for techniques to manage use of multiple subscriptions in multi-SIM devices, including in those that use demodulation reference signal (DMRS) bundling.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication performed by a user equipment (UE) includes: operating in a dual SIM dual active (DSDA) mode with respect to a first subscriber identity module (SIM) and a second SIM; controlling transmit operations of the first SIM and the second SIM according to a time division multiplexed (TDM) priority pattern; performing demodulation reference signal (DMRS) bundling on the first SIM, the first SIM having a higher priority state according to the TDM priority pattern; and deferring a priority switch to give the higher priority state to the second SIM until after the first SIM has completed a repetition of DMRS bundling.

In an additional aspect of the disclosure, a user equipment (UE) includes: a first subscriber identity module (SIM) associated with a first service provider subscription and a second SIM associated with a second service provider subscription; and a processor configured to access the first SIM and the second SIM, where the processor is further configured to: receiving information indicating a first band for use with the first SIM and a second band for use with the second SIM; determining that the first band and the second band are incompatible with demodulation reference signal (DMRS) bundling in a dual SIM dual active (DSDA) operating mode; and informing a base station that DMRS bundling is unavailable at the UE.

In an additional aspect of the disclosure, a non-transitory computer-readable medium having program code recorded thereon for wireless communication by a UE, the program code includes: code for operating in a dual SIM dual active (DSDA) mode with respect to a first subscriber identity module (SIM) and a second SIM; code for controlling transmit operations of the first SIM and the second SIM according to a time division multiplexed (TDM) priority pattern; code for performing demodulation reference signal (DMRS) bundling on the first SIM, the first SIM having a higher priority state according to the TDM priority pattern; and code for switching the higher priority state to the second SIM during the DMRS bundling on the first SIM; and code for reducing a transmit power of the first SIM during the DMRS bundling on the first SIM, including maintaining phase continuity of the first SIM.

In an additional aspect of the disclosure, a UE includes means for receiving information indicating a first band for use with a first subscriber identity module (SIM) and a second band for use with a second SIM; means for determining that the first band and the second band are incompatible with demodulation reference signal (DMRS) bundling in a dual SIM dual active (DSDA) operating mode; and means for taking an action with respect to DMRS bundling in response to determining that the first band and the second band are incompatible with DMRS bundling, including either one or both of: means for advertising a lack of capability for DMRS bundling and means for requesting that DMRS bundling be disabled.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

BRIEF DESCRIPTION OF THE DRAWINGS

FIGS. 4-6 are example timelines for transmitting and receiving in a multi-SIM device, according to some aspects of the disclosure.

DETAILED DESCRIPTION

Figure 1:
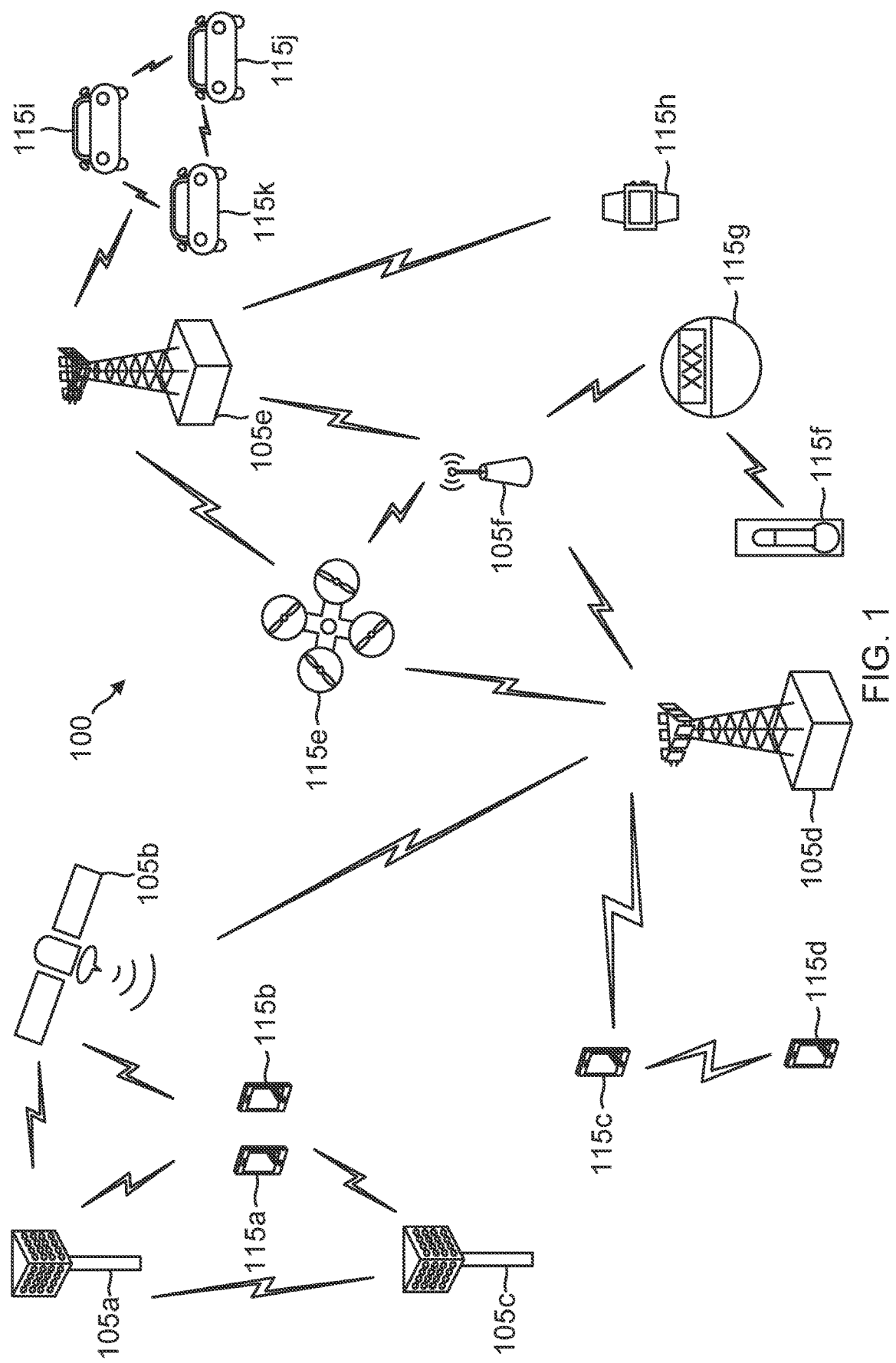
FIG. 1 illustrates an example wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5$^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16. IEEE 802.20, flash-OFDM and the like. UTRA. E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 50, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UI/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a wireless communication device or UE is a multiple SIM (multi-SIM) device capable of utilizing multiple subscriptions for communication with one or more networks. For instance, the UE may include two SIMs, a first SIM for a first subscription and a second SIM for a second subscription. In some instances, the first and second subscriptions may be provided by the same operator. For example, the first subscription and the second subscription may correspond to different user accounts and/or services on the same operator network. In other instances, the first and second subscriptions may be provided by different operators. In any case, in certain scenarios, the UE may communicate using the first subscription and/or the second subscription. In some instances, the UE may operate in a dual-SIM dual-standby (DSDS) mode, where both subscriptions can be on standby (in an idle mode) waiting to begin communications. However, when a communication or network connection is established on one SIM (e.g., the first subscription), the other SIM (e.g., the second subscription) is no longer active. That is, one SIM may be active at a given time. The DSDS mode may be suitable for UEs that are equipped with a single transceiver and/or radio frequency (RF) chain which can either be utilized by the first subscription or the second subscription. In other instances, the UE may operate in a dual-SIM dual-active (DSDA) mode, where the UE may simultaneously connect to the same network or different networks via the first SIM and the second SIM. To operate in the DSDA mode, the UE may have separate transceiver and/or RF chains or resources for the first SIM and the second SIM. In the present disclosure, an operation or communication performed via a SIM may refer to an operation or communication performed for a wireless service subscription associated with the SIM (where the subscription information for the wireless service is stored).

The concept of demodulation reference signal (DMRS) bundling has been introduced for use across both physical UL shared channel (PUSCH) repetitions and PUSCHs with different transport blocks (TBs). DMRS bundling may be an effective technique for enhancing cell coverage, including for uplink (UL) communications near the edge or boundary of a cell. At the UE, the DMRSs can be coherently transmitted over different time instants corresponding to different uplink transmissions (e.g., PUSCH transmissions and/or physical UL control channel (PUCCH) transmissions). At the BS, the DMRSs received over different time instants can be coherently filtered and/or combined to enhance the accuracy of channel estimation. That is, the DMRSs received over the different time instants can be processed jointly instead of separately or individually.

However, a constraint of DMRS bundling is that the UE may be required to maintain phase coherence and continuity across the different DMRSs in different PUSCH slots within the bundle. There may be scenarios that impact the UEs phase continuity ability, such as transmit power changes, timing advance application, retune requirement do to uplink switching, and the like. In other words, while DMRS bundling may be beneficial in some instances, it may pose problems in other instances.

Currently, 3rd Generation Partnership Project (3GPP) is working to implement rules for use of DMRS bundling. For instance, one proposed rule would not require UEs to perform timing advance application, transmit power changes due to transmit power control, and the like which might impact phase continuity while in a current DMRS repetition window. Another proposed rule would expect the network to not change or request a configuration during a current repetition window if that configuration change would impact UE phase continuity.

Such rules might be helpful for single-SIM UEs, but there are specific issues relating to multi-SIM UEs to be addressed. In one example, there are phase continuity requirements in transmit chain sharing in DSDA in which a transmitter chain is shared or retuned across the two SIMs. In another example, there are coexistence scenarios where the transmit power chain is backed off based on a configuration of the other SIM.

In one example, a UE receives information indicating a first band for use with the first SIM and a second band for use with the second SIM. For instance, the UE may receive the information from the network itself or from an application (e.g., a machine learning application) that predicts which bands will be configured for the SIMs. The UE may then determine that the first band and the second band are incompatible with DMRS bundling for a DSDA operating mode. For instance, the two different bands may not be supported for full concurrency and may instead be operated only in a transmit sharing mode. In another example, the band used by the first SIM may be associated with a transmit power back off during reception by the second SIM, where transmit power back off may interfere with phase coherence during DMRS bundling.

Continuing with the example, the UE may then inform the base station that interacts with the first SIM that DMRS bundling is unavailable at the UE. For instance, the UE may provide a capability report to the base station to indicate an inability to support DMRS bundling. In another example, the UE may indicate to the base station that DMRS bundling is unavailable by requesting that the base station disable DMRS bundling at least temporarily.

In another example, the UE operates in a DSDA mode and controls transmit operations of the first SIM and the second SIM according to a time division multiplexed (TDM) priority pattern. The first SIM may perform DMRS bundling, the first SIM having a higher priority state according to the TDM priority pattern. This may include deferring a priority switch to give the higher priority state to the second SIM until after the first SIM has completed a repetition of DMRS bundling. If extra time is added to the first SIM's priority status, then after the priority switch, similar added time may be given to the second SIM.

In yet another example, the UE may apply a transmit back off for the first SIM in the middle of the DMRS bundle by using filter output scaling in the baseband to help maintain phase continuity. Similarly, the UE may lower a power amplifier state to adjust to reduce the transmit power, and the transmit front end may then compensate for the power amplifier adjustment. Still, such approach may allow for phase coherence to be maintained.

Various implementations may include advantages. For instance, implementations that disable or otherwise advertise an inability to use DMRS bundling may avoid performance penalties that would be imposed by the network if the UE were to attempt DMRS bundling but failed to maintain phase coherence. In other words, throughput gained by not using DMRS bundling in some scenarios may outweigh any benefit that would have otherwise been provided by DMRS bundling.

In another example, implementations that adjust a priority assigned by a TDM priority pattern may benefit from both SIMs being able to transmit full DMRS bundles while maintaining fairness between the SIMs. In another implementation that performs DMRS bundling but compensates by using filter output scaling in baseband or by using a transmit front end, that implementation may also allow both SIMs to transmit full DMRS bundles while maintaining fairness between the SIMs. Once again, DMRS bundling may allow for an increase in overall UL performance by providing the base station with a reference signal that it can use for channel estimation and UL grants. Increasing a use of DMRS bundling, or at least avoiding attempting DMRS bundling when it may fail, may thus result in a higher UL throughput despite any technical issues arising from multi-SIM UEs.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 1115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i. 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a UE 115 may be capable of utilizing multiple SIMs and may accommodate DMRS bundling, as explained in more detail below.

Figure 2:
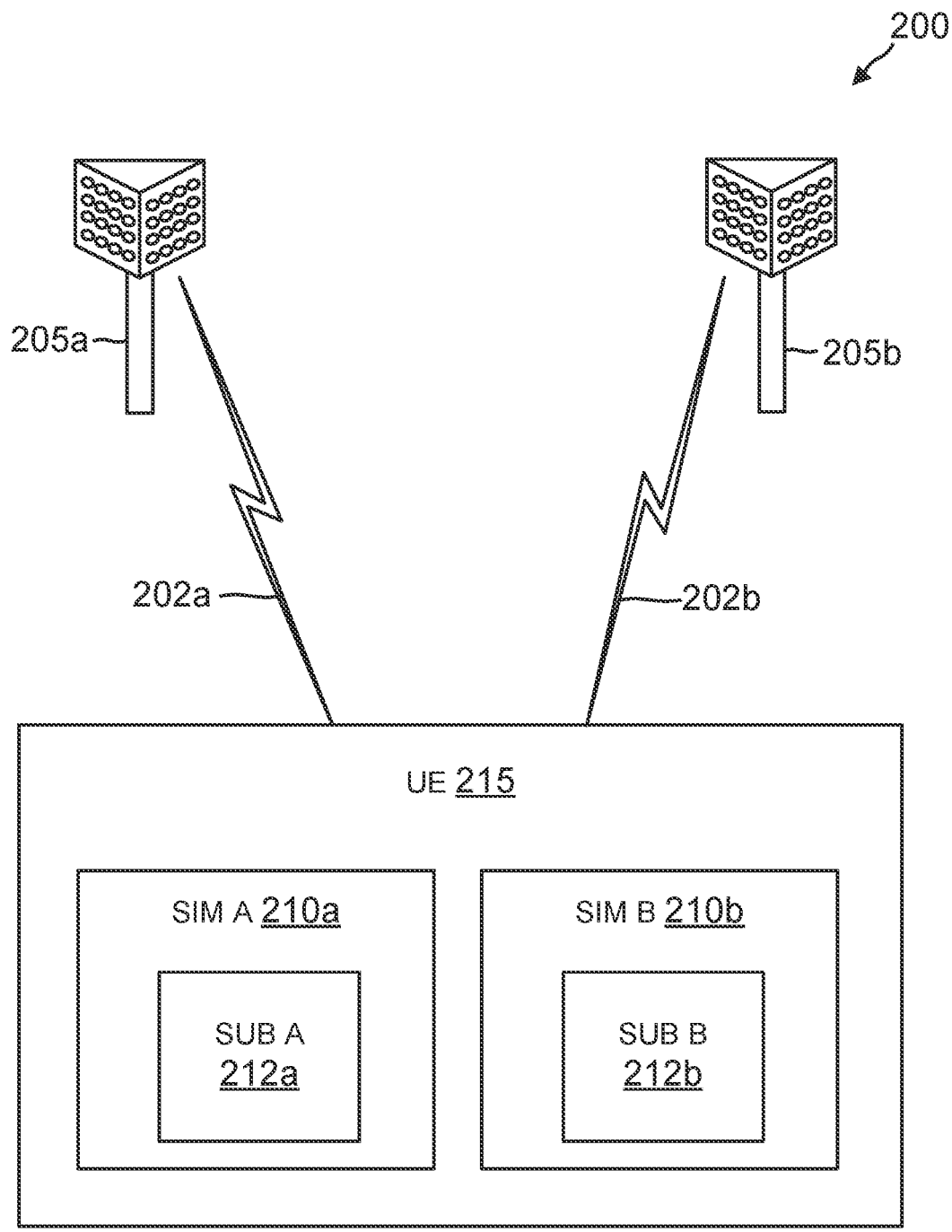
FIG. 2 illustrates an example communication scenario utilizing multiple subscriptions according to some aspects of the present disclosure.

FIG. 2 illustrates a communication scenario 200 that utilizes multiple subscriptions according to some aspects of the present disclosure. The communication scenario 200 may correspond to a communication scenario among BSs 105 and or UEs 115 in the network 100. For simplicity, FIG. 2 illustrates two BSs 205 (shown as 205*a* and 205*b*) and one UE 215, but a greater number of UEs 215 (e.g., the about 3, 4, 3, 6, 7, 8, 9, 10, or more) and/or BSs 205 (e.g., the about 3, 4 or more) may be supported. The BS 205 and the UEs 215 may be similar to the BSs 105 and the UEs 115, respectively.

In the scenario 200, the UE 215 is capable of utilizing multiple SIMs (e.g., SIM cards) for communication with one or more networks. For simplicity, FIG. 2 illustrates the UE 215 including two SIMs 210 (shown as SIM A 210*a* and SIM B 210*b*), but the UE 215 may include more than two SIMs (e.g., about 3, 4 or more). In some aspects, each SIM 210 may include integrated circuits and/or memory configured to store information used for accessing a network, for example, to authenticate and identify the UE 215 as a subscriber of the network. Some examples of information stored at the SIM A 210*a* and/or SIM B 210*b* may include, but not limited to, a subscriber identity such as an international mobile subscriber identity (IMSI) and/or information and/or key used to identify and authenticate the UE 215 in a certain provider network. As an example, the UE 215 may subscribe to a first operator and a second operator. That is, the UE 215 may have a first subscription 212*a* (shown as SUB A) with the first operator and a second subscription 212*b* (shown as SUB B) with the second operator. Accordingly, the SIM A 210*a* may store or maintain information for accessing a network of the first operator based on the first subscription 212*a*, and the SIM B 210*b* may store information for accessing a network of the second operator based on the second subscription 212b. In some instances, the first operator and the second operator may correspond to the same operator. For example, the first subscription 212a and the second subscription 212b may correspond to different user accounts and/or services subscribed with the same operator. In other instances, the first operator may be different from the second operator.

In operation, the UE 215 may communicate with a BS 205a (operated by the first operator) using the SIM A 210a via a radio link 202a. Further, the UE 215 may communicate with a BS 205b (operated by the second operator) using the SIM B 210b via a radio link 202b. In some aspects, the UE 215 may use the same radio access technology (e.g., NR or NR-U) for communication with the BS 205a and the BS 205b. In other aspects, the UE 215 may use one radio access technology (e.g., NR or NR-U) for communication with the BS 205a and another radio access technology (e.g., LTE) for communication with the BS 205b. Although FIG. 2 illustrates the UE 215 communicates with different BSs 205 using the SIM A 210a and the SIM B 210b, it should be understood that in other examples the UE 215 may communicate with the same BS. For instance, the UE 215 may communicate with the same BS 205a for the first subscription 212a via the SIM A 210a and for the second subscription 212b via the SIM B 210b.

In some aspects, the UE 215 may operate in a DSDS mode, where both SIMs 210a and 210b can be on standby (in an idle mode) waiting to begin communications. When a communication is established on one SIM (e.g., the SIM A 210a), the other SIM (e.g., the SIM B 210b) is no longer active. That is, one SIM may be active at a given time. For instance, both SIMs 210 may share a single transceiver and/or RF chain at the UE 215 for communications with corresponding network(s). In DSDA mode, both SIMs 210a and 210b can be active at the same time, as in the examples of FIGS. 4-6.

In some aspects, the radio link 202a between the UE 215 and the BS 205a and the radio link 202b between the UE 215 and the BS 205b may be over orthogonal bands such as FR1/FR2 or low band/high band FR1. Of course, any combination of radio links 202 is possible, and the radio links may even take place using different radio access technologies. For instance, radio link 202a may carry communications according to 5G protocols, whereas radio link 202b may carry communications according to LTE protocols.

Furthermore, UE 215 may manage DMRS bundling for DSDA operation, according to the techniques described below with respect to FIGS. 7-9.

Figure 3:
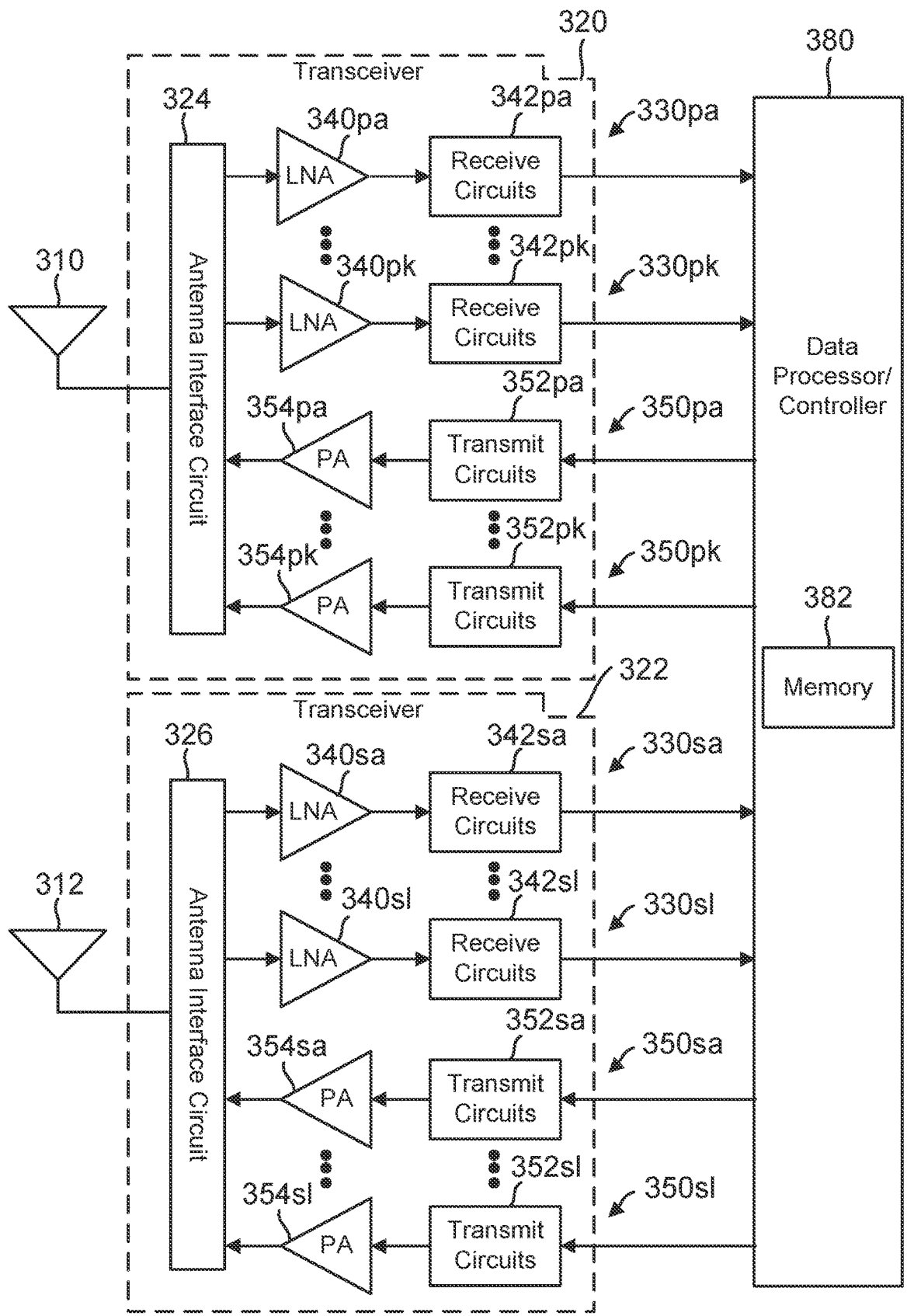
FIG. 3 is a block diagram of an example hardware architecture of a UE, such as the UEs of FIGS. 1-2, according to some aspects of the present disclosure.
Figure 10:
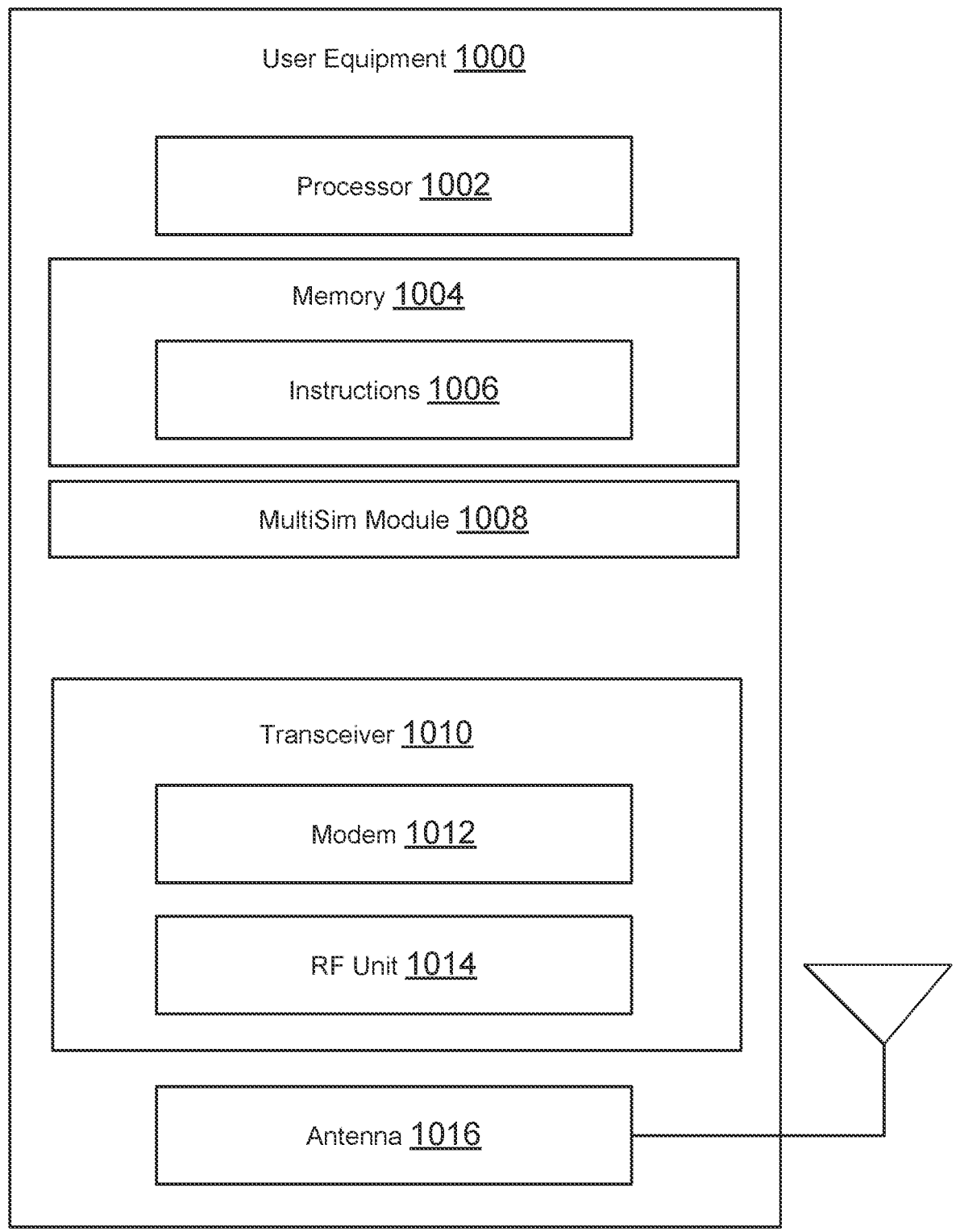
FIG. 10 illustrates a block diagram of an example user equipment (UE) according to some aspects of the present disclosure.

FIG. 3 illustrates an example hardware architecture for RF chains, which may be implemented within UE 115 (FIG. 1), UE 215 (FIG. 2), or UE 1000 (FIG. 10). In this exemplary design, the hardware architecture includes a transceiver 320 coupled to a first antenna 310, a transceiver 322 coupled to a second antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330s1 and L transmitters 350sa to 350s1 to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal, which may be routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver, though the described operations apply equally well to any of the other receivers 330. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380. Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in a similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter, though the described operations apply equally well to any of the other transmitters 350. Within transmitter 350pa, transmit circuits 352pa amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal may be routed through antenna interface circuit 324 and transmitted via antenna 310. Each remaining transmitter 350 in transceivers 320 and 322 may operate in a similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog (ICs, RF ICs (RFICs), mixed-signal ICs, etc. For example, LNAs 340 and receive circuits 342 within transceivers 320 and 322 may be implemented on multiple IC chips or on the same IC chip. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

Controller 380 may be in communication with one or more SIMs to provide DSDA operation in which both SIMs may be in active mode at the same time. The controller 380 may execute software logic that assigns one of the transceivers 320, 322 to a particular SIM and the other one of the transceivers to the other SIM in a dual SIM implementation. In another example, the controller 380 may assign both transceivers 320, 322 to both SIMs, thereby allowing both SIMs to employ multi-antenna operations, such as beam forming and the like. In one example implementation, one of the SIMs is active, whereas the other SIM is in idle mode. During an SRS occurrence, the first SIM (e.g., the DDS) may use the transmitting portions of either or both of the transceivers 320, 322 to transmit an SRS. The network may then use received SRS to estimate the DL channel for the RX ports (e.g., antenna/transceiver pairs) of the UE.

In some examples, the transmit hardware may be configured by the network for UL on certain frequency bands that may be associated with TX sharing. For instance, if the first SIM and the second SIM are both configured for UL on the upper range of FR1 or both on the lower range of FR1, then the first SIM and the second SIM may rely on the same filters, oscillators, or other hardware and, thus, may be forced into TX sharing.

An example is shown in timeline 400 of FIG. 4, where a first SIM, associated with a first subscription (Sub 1) has a higher priority (HP) than does the second SIM that is associated with a second subscription (Sub 2). UL transmissions 401-403 may proceed, whereas the UE would not be able to perform UL transmissions 404 and 405 overlapping in time because of transmit hardware sharing. In this instance, UL transmission 405 is canceled because UL transmission 404 has higher priority. Transmit hardware sharing (TX sharing) band combinations may be incompatible with DMRS because those band combinations may cause the transmit hardware to dynamically retune from one band to the other, thereby potentially losing phase coherence. If the UE loses phase coherence across multiple DMRS symbols, the network may incorrectly estimate the channel of the UE's receiver, thereby resulting in performance deterioration. Implementations described herein may advertise a lack of capability to support DMRS bundling when band combinations would otherwise cause TX sharing. Other implementations described herein may enable and disable DMRS bundling semi-statically so that DMRS bundling can be used when band combinations are not associated with TX sharing and avoided when band combinations are associated with TX sharing.

In another example, if the first SIM is configured for UL on FR1, and the second SIM is configured for UL on FR2, then the first SIM and the second SIM may use separate filters, oscillators, and the like, thereby allowing for full concurrency. Similarly, some implementations may allow for full concurrency with one SIM on a high band of FR1 and the other SIM on a lower band of FR1. Of course, these are just examples, and the scope of implementations is not limited to any particular band combination nor any particular hardware combination that may or may not allow for full concurrency. An example of full concurrency is shown in timeline 500 of FIG. 5, in which transmissions 501-505 may proceed, and even transmissions 504 and 505 may proceed without interruption because the particular band combination is not associated with TX sharing.

In another example, a UL transmission by the second SIM may potentially interfere with a DL reception by the first SIM. For instance, some frequency bands are close together and may be difficult for the RF receive filters to attenuate when received at full power from transmit hardware. Such frequency bands may be associated with coexistence, where the processor 380 is programmed to reduce a power of the transmit signal by the second SIM during a receive operation by the first SIM. An example is shown in timeline 600 of FIG. 6, which illustrates example UL transmissions 601, 603, 605 and example DL receptions 602, 604. The power of UL transmission 605 is reduced (backed off) to provide coexistence by reducing potential interference with DL reception 604. However, reducing transmit power has the potential to cause loss of phase coherence.

Figure 6:
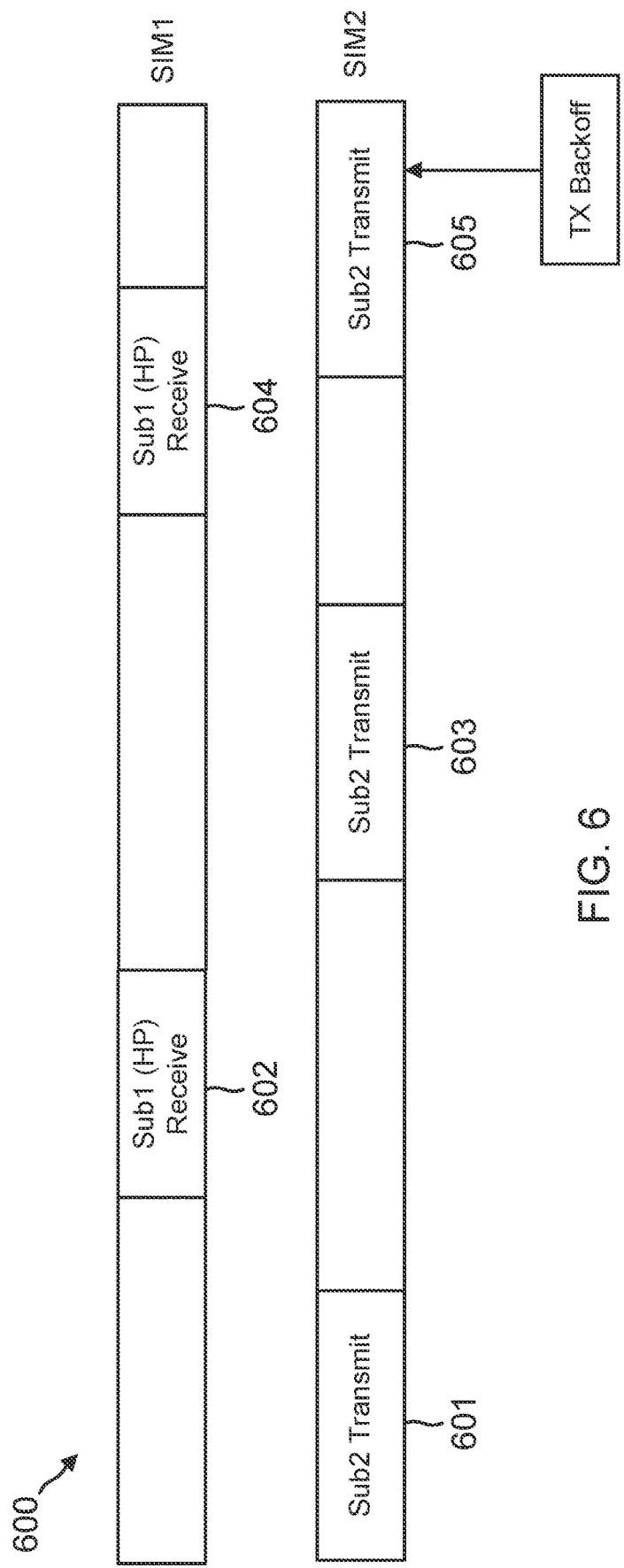

Returning to FIG. 3, the processor 380 may be programmed to control the hardware of FIG. 3 to accommodate DMRS bundling according to the actions described below with respect to FIGS. 7-9 and according to the context described with respect to FIGS. 4-6.

Figure 7:
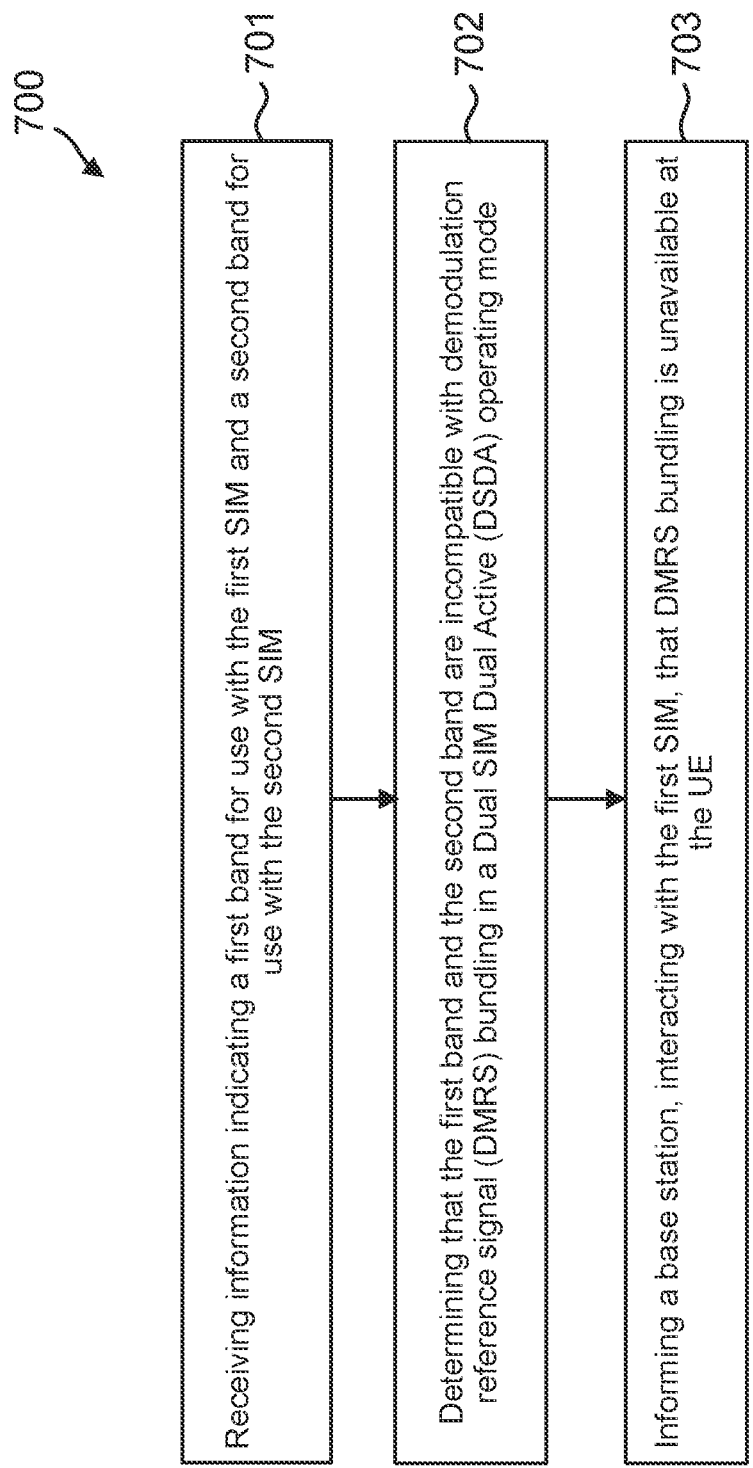
FIG. 7 is a diagram of an example method for accommodating DMRS bundling in a multi-SIM device, according to some aspects of the present disclosure.

FIG. 7 is a flowchart of a method 700 to adjust increase performance in a multi-SIM system that supports DSDA and DMRS bundling, according to some aspects of the present disclosure. The method 700 may be performed by UE, such as UE 115 (FIG. 1), UE 215 (FIG. 2), or UE 1000 (FIG. 10). As illustrated, the method 700 includes a number of enumerated actions, but aspects of the method 700 may include additional actions before, after, and in between the enumerated actions. In some aspects, one or more of the enumerated actions may be omitted or performed in a different order.

At action 701, the UE receives information indicating a first band for use with the first SIM and indicating a second band for use with the second SIM. For instance, the information may be received from a network that configures the UE to perform UL operations on specified frequency bands. In another example, the information may be received from an application that can predict possible DSDA band combinations that would be exercised in the current location or an upcoming predicted route. For instance, the application may include a trained machine learning algorithm that predicts DSDA band combinations from any of a variety of inputs, such as current location, operators serving the different SIMs, direction of travel, and the like. In any event, the processor of the UE may have information of a frequency band combination, with a first frequency band corresponding to the first SIM and a second frequency band corresponding to the second SIM.

At action 702, the UE determines that the first frequency band and the second frequency band are incompatible with DMRS bundling during a DSDA operating mode. For instance, the UE may recognize that the first band and the second band are associated with a transmitter tune away from the first SIM to the second SIM, such as described above with respect to FIG. 4. In other words, the hardware of the UE may not support simultaneous operation in the first band and the second band.

In yet another example, the UE may determine that the first band and the second band are associated with a transmitter power back off of either the first SIM or the second SIM. An example is given above with respect to FIG. 6. Of course, these are just examples, and the scope of implementations may include any determination of incompatible bands, including any combination of bands that might cause the UE to perform an operation that would cause loss of phase coherency during a DMRS bundling operation.

At action 703, the UE informs a network base station, which interacts with the first SIM, that DMRS bundling is unavailable at the UE. Various examples of informing the base station of DMRS bundling unavailability include advertising a lack of DMRS bundling capability, requesting that the base station disable DMRS bundling for either the first SIM or the second SIM, and the like.

For instance, in an example in which the UE advertises a lack of DMRS bundling capability, the UE may perform action 703 at any appropriate time. In one implementation, the UE may perform action 703 upon entering DSDA mode. The UE may employee a tracking area update (TAU) procedure to cause the network to re-query UE capability, at which point the UE advertises its lack of capability for DMRS bundling upon entering DSDA mode. However, the UE may perform action 703 at other times, such as upon completion of action 702, whether or not, or even before, the UE has entered DSDA mode.

In an example in which the UE requests that the base station disable DMRS bundling, action 703 may be performed in any of a variety of ways. In some implementations, there may be a defined semi-static procedure for the UE to request enabling and disabling DMRS bundling over multiple TBs. For instance, the UE may employ an information element (IE) in a UE assistance information (UAI) message to request enabling or disabling DMRS bundling. For instance, the UE may perform action 703 upon determining that a band combination (either predicted or configured) is incompatible with frequency coherence required for DMRS bundling. The UE may, accordingly, send a UAI message to request that DMRS bundling be disabled.

Although not explicitly shown in FIG. 7, in subsequent usage one or both of the frequency bands may be replaced by other frequency bands that are compatible with DMRS bundling and maintaining frequency coherence. In such an instance, the UE may determine that DMRS bundling is appropriate with the new frequency band combination and send a further UAI message to the network to request enabling DMRS bundling.

The actions 701-703 may be repeated as often as appropriate. For instance, as the UE moves from one base station to another base station, configurations may be changed, including a combination of frequency bands, and DSDA may be turned on or off. Accordingly, the UE may perform the actions described above to avoid being configured to perform DMRS bundling when the frequency band combination is incompatible with DMRS bundling, and the UE may also re-enabled DMRS bundling at appropriate times.

Various embodiments may provide advantages over prior systems. For instance, embodiments may perform DMRS bundling when phase coherence can be maintained and avoid performing DMRS bundling when phase coherence may not be maintained. Therefore, the UE may provide the network with more appropriate DMRSs for the network to measure the receive channel and to configure DL operation of the UE. As a result, those systems may increase throughput, thereby increasing data per battery charge efficiency and data per time efficiency. Furthermore, such systems may also increase user satisfaction by having faster download times.

Figure 8:
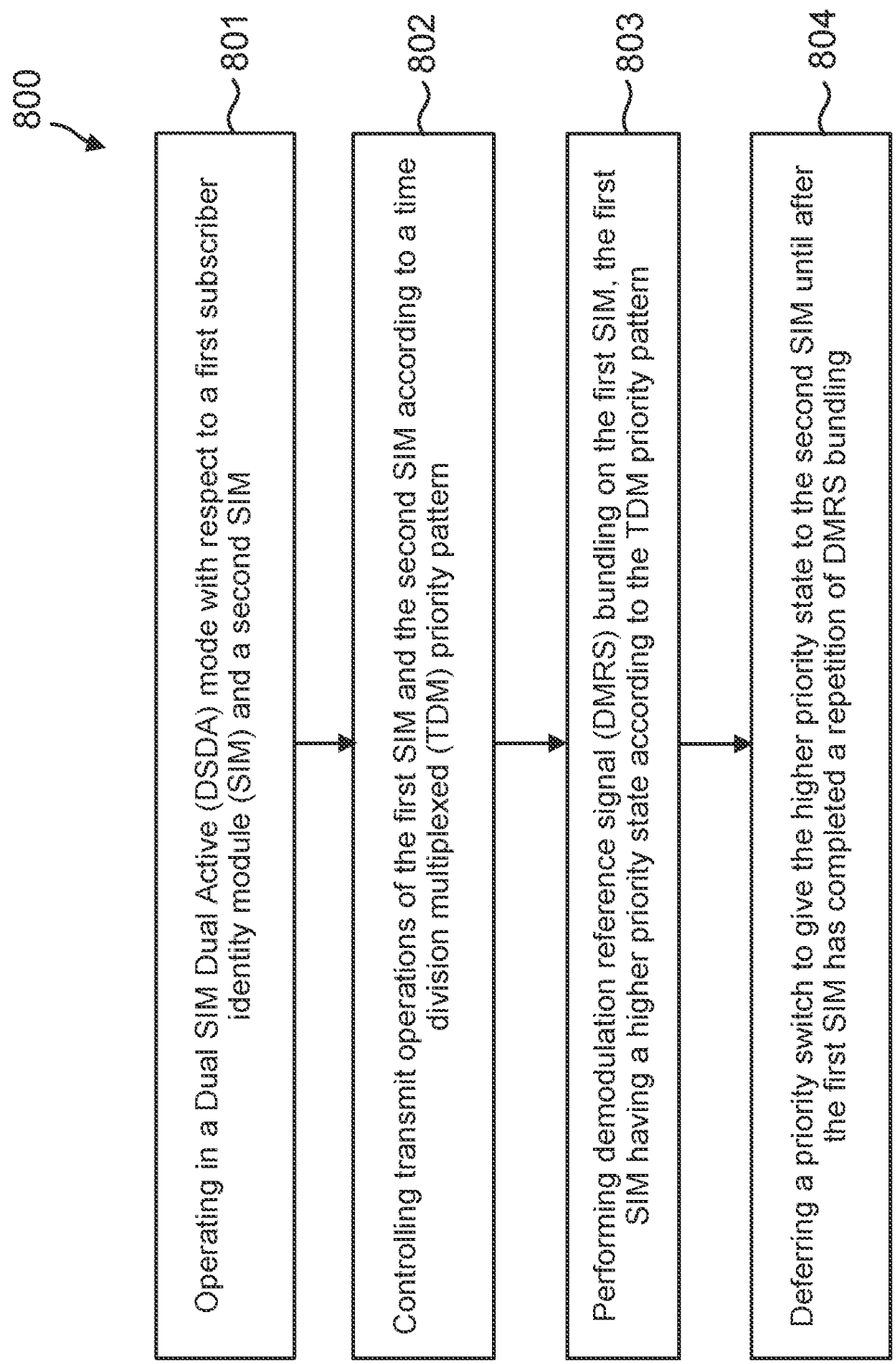
FIG. 8 is a diagram of an example method for accommodating DMRS bundling in a multi-SIM device, according to some aspects of the present disclosure.

FIG. 8 is a flowchart of a method 800 to adjust increase performance in a multi-SIM system that supports DSDA and DMRS bundling, according to some aspects of the present disclosure. The method 800 may be performed by UE, such as UE 115 (FIG. 1), UE 215 (FIG. 2), or UE 1000 (FIG. 10). As illustrated, the method 800 includes a number of enumerated actions, but aspects of the method 800 may include additional actions before, after, and in between the enumerated actions. In some aspects, one or more of the enumerated actions may be omitted or performed in a different order.

Method 800 may be performed in a TX sharing scenario as well as in a full concurrency with coexistence scenario. For instance, in a TX sharing scenario, transmit hardware sharing and the associated transmit switching between the two SIMs is controlled by a TDM based priority pattern. In one implementation, the UE may defer a priority switch from the first SIM to the second SIM (e.g., a transmit hardware switch) until the end of a current DMRS bundling repetition being performed by the first SIM. Once this is done for the first SIM, the same may be done for the other SIM if both of the SIMs are configured with DMRS bundling. In other words, if an amount of time that one SIM has a higher priority state is extended, then a same or similar amount of time may be added to the higher priority state for the other SIM. This may help to ensure that transmit hardware resources are shared between the two SIMs based on the configured repetition pattern or transmission over multiple TBs, such that a given DMRS bundle is transmitted without having any issue on either SIM.

Now looking to an example in which there is full concurrency with coexistence, method 800 is similar. As discussed above with respect to FIG. 6, full concurrency with coexistence may include backing off transmit power when the transmit power of one SIM would interfere with reception by the other SIM having a higher priority state. Vice versa is also possible—reception for one SIM may be blanked or performed according to best efforts when that SIM is in a lower priority state than a transmitting SIM. In this example, the decision to either back off transmit power or blank a reception is based on a TDM priority pattern. If the priority state change would change the priority of an aggressor in a coexistence-impacted band combination, various implementations may be made to defer the change of the priority state until the current repetition of DMRS bundling is complete. The additional time added to the aggressor SIM may then be used to extend the high priority state of the other SIM by the same or similar duration to achieve a same or similar time ratio of priority between the two SIMs.

In any event, whether method 800 is performed in a TX sharing scenario or in a full concurrency with coexistence scenario, method 800 may help to ensure that DMRS bundling is complete by one SIM before taking an action that would result in loss of phase coherence for the other SIMs. Method 800 may also be used to provide an amount of fairness between the two SIMs by switching priority between the two SIMs and attempting to add a same or similar amount of time to a high priority state of both SIMs over time.

At action 801, the UE operates in a DSDA mode with respect to a first SIM and a second SIM. At action 802, the UE controls transmit operations of the first SIM and the second SIM according to a time division duplex priority pattern. For instance, the priority pattern may shift a priority state from one SIM to the other SIM periodically. In a TX sharing scenario, higher priority state may indicate that a given SIM may use TX hardware before having to share that TX hardware with the other SIM. In a full concurrency with coexistence scenario, a higher priority state may indicate that a given SIM may not have to reduce its transmit power or blank its reception on account of a transmission reception by the other SIM.

At action 803, the first SIM has a higher priority state according to the TDM priority pattern. The first SIM performs a DMRS bundling operation, which may include the first SIM transmitting multiple DMRSs over different time instants, perhaps even over multiple TBs, corresponding to different UL transmissions (e.g., PUSCH transmissions and/or PUCCH transmissions) and with coherent phase.

At action 804, the TDM priority pattern may indicate that priority should be switched from the first SIM to the second SIM. However, action 804 includes deferring a priority switch for an amount of time corresponding to the first SIM reaching completion of a repetition of DMRS bundling. Put another way, the priority switch may be deferred until the first SIM has completed its repetition of DMRS bundling.

The scope of implementations is not limited to the specific actions shown in FIG. 8. Action 804 may further include performing the priority switch to give the higher priority state to the second SIM and then adding time to the higher priority state as applied to the second SIM in compensation for deferring the priority switch. Switching may be performed back-and-forth from the first SIM to the second SIM and back to the first SIM multiple times over during operation. Also, when time is added to a higher priority state of one SIM, a similar amount of time may be added to the other SIM for its higher priority state.

Also, the scope of implementations may include the capability to determine to make the priority switch during DMRS bundling by one SIM if that SIM has completed less than a threshold amount of the DMRS bundling repetition. The threshold may be set at any appropriate amount, such as 10%, 20%, or the like. In a particular example, when the priority pattern indicates that priority should switch from the first SIM to the second SIM, the UE may compare a progress of the DMRS bundling repetition to the threshold and, if the progress is below the threshold, may switch the priority to the other SIM. Method 800 may then include allowing the first SIM to complete a DMRS bundling repetition in the next scheduled DMRS bundling repetition.

Figure 9:
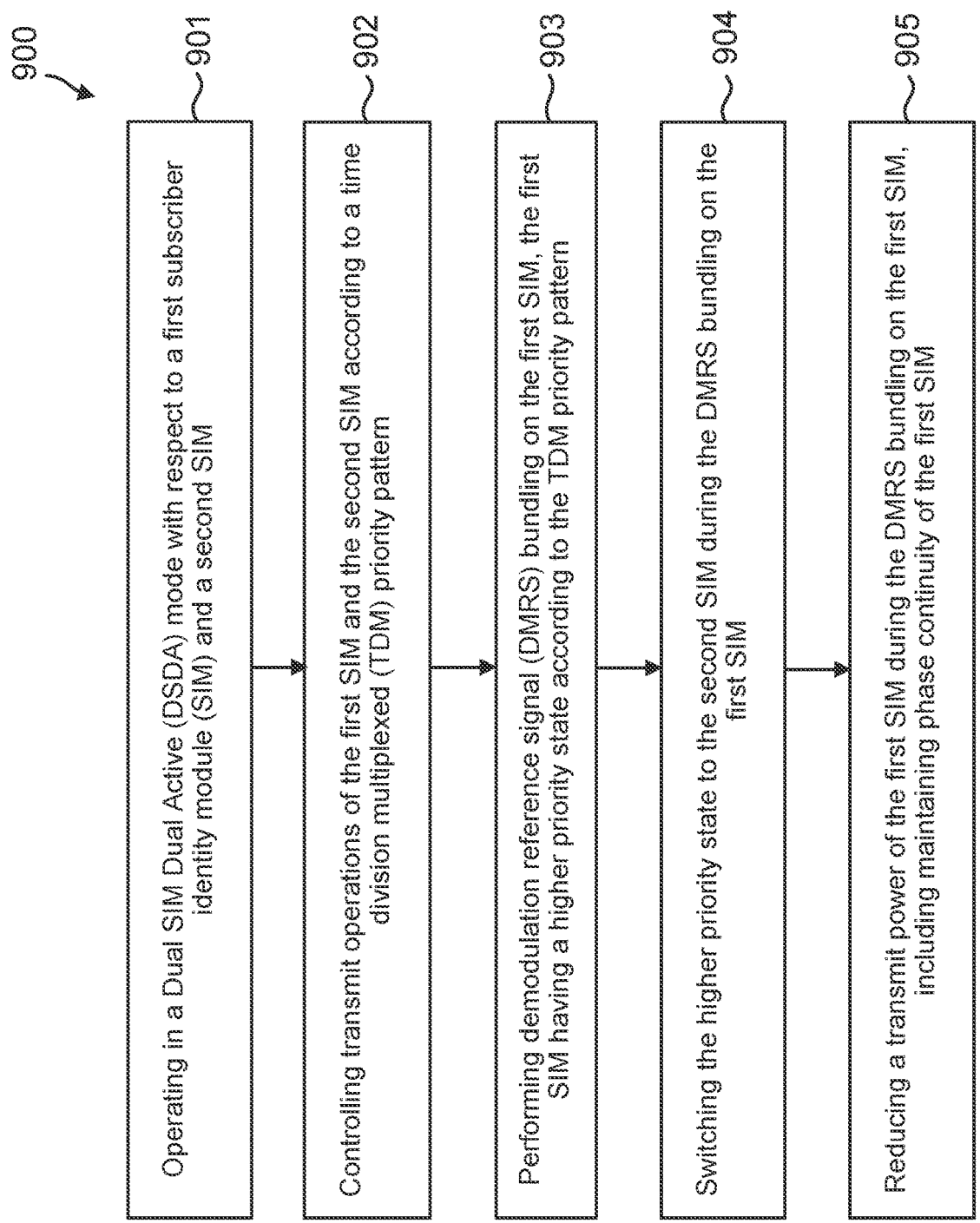
FIG. 9 is a diagram of an example method for accommodating DMRS bundling in a multi-SIM device, according to some aspects of the present disclosure.

FIG. 9 is a flowchart of a method 900 to adjust increase performance in a multi-SIM system that supports DSDA and DMRS bundling, according to some aspects of the present disclosure. The method 900 may be performed by UE, such as UE 115 (FIG. 1), UE 215 (FIG. 2), or UE 1000 (FIG. 10). As illustrated, the method 900 includes a number of enumerated actions, but aspects of the method 900 may include additional actions before, after, and in between the enumerated actions. In some aspects, one or more of the enumerated actions may be omitted or performed in a different order.

Method 900 is performed in the context of a full concurrency with coexistence scenario. Specifically, a higher priority state may be switched from one SIM to the other SIM according to a TDM priority pattern, even if one SIM is performing a DMRS bundling repetition. The switch in priority may be accompanied by compensation measures that maintain phase coherency, even in a SIM that is currently transmitting and is caused to perform transmit power back off.

Actions 901-903 are the same as or similar to actions 801-803 of FIG. 8.

Now looking to action 904, it includes switching the higher priority state from the first SIM to the second SIM during DMRS bundling on the first SIM. At action 905, the UE reduces the transmit power of the first SIM during the DMRS bundling on the first SIM. This is in response to switching the higher priority state from the first SIM to the second SIM. However, the UE maintains a phase continuity of the first SIM.

Phase continuity may be maintained in any appropriate manner. In one implementation, the UE may reduce the transmit power of the first SIM by applying filter output scaling in the baseband without changing analog gain. An amount of filter output scaling that may be used to reach the goal of maintaining phase continuity may be determined from simulation or experimentation and then stored in memory of the UE for multiple conditions and multiple output scaling values. In another implementation, the UE may lower a power amplifier state to reduce the transmit power while at the same time applying phase compensation in the RF portion of the transmit chain. Such implementation may be seen as a coarse adjustment for transmit back off, but it may still provide for phase coherence maintenance. These are just examples, and compensation may be applied anywhere that is appropriate in the transmit chain, whether in a baseband portion or a RF portion. Once again, an amount of compensation that may be used may be determined from simulation or experimentation and then stored in memory of the UE for multiple conditions and multiple power reduction values.

An advantage of the method 900 may include providing less interruption to DMRS bundling, thereby allowing for better channel estimation at the network and, therefore, higher UL throughput for the UE.

FIG. 10 is a block diagram of an exemplary UE 1000 according to some aspects of the present disclosure. The UE 1000 may be a UE 115 or UE 215 as discussed above in FIGS. 1-2 and may conform to the hardware architecture described above with respect to FIG. 3. As shown, the UE 1000 may include a processor 1002, a memory 1004, a multi-SIM module 1008, a transceiver 1010 including a modem subsystem 1012 and a radio frequency (RF) unit 1014, and one or more antennas 1016. These elements may be coupled with one another. The term "coupled" may refer to directly or indirectly coupled or connected to one or more intervening elements. For instance, these elements may be in direct or indirect communication with each other, for example via one or more buses.

The processor 1002 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 1002 may also be implemented as a combination of computing devices, e.g., a combination of a DSP and a microprocessor, a plurality of microprocessors, one or more microprocessors in conjunction with a DSP core, or any other such configuration.

The memory 1004 may include a cache memory (e.g., a cache memory of the processor 1002), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 1004 includes a non-transitory computer-readable medium. The memory 1004 may store, or have recorded thereon, instructions 1006. The instructions 1006 may include instructions that, when executed by the processor 1002, cause the processor 1002 to perform the operations described herein with reference to a UE 115, 215 in connection with aspects of the present disclosure, for example, aspects of FIGS. 1-9. Instructions 1006 may also be referred to as code, which may include any type of computer-readable statements.

The multi-SIM module 1008 may be implemented via hardware, software, or combinations thereof. For example, the multi-SIM module 1008 may be implemented as a processor, circuit, and/or instructions 1006 stored in the memory 1004 and executed by the processor 1002.

In some aspects, the multi-SIM module 1008 may include multiple SIMs or SIM cards (e.g., 2, 3, 4, or more) similar to the SIMs 210. Each SIM may be configured to store information used for accessing a network, for example, to authenticate and identify the UE 1000 as a subscriber of the network. Some examples of information stored on a SIM may include, but not limited to, a subscriber identity such as an international mobile subscriber identity (IMSI) and/or information and/or key used to identify and authenticate the UE 1000 in a certain provider network. In some aspects, the UE 1000 may have a first subscription on a first SIM of the multiple SIMs and a second subscription on a second SIM of the multiple SIMs. The first subscription may identify the UE 1000 by a first subscriber identity, and the second subscription may identify the UE 1000 by a second subscriber identity.

In some embodiments, the functionality described above with respect to FIGS. 7-9 may be included as logic within multi-SIM module 1008. Other embodiments, the functionality may be included in another component, such as in computer readable code within instructions 1006 in memory 1004.

As shown, the transceiver 1010 may include the modem subsystem 1012 and the RF unit 1014. The transceiver 1010 can be configured to communicate bi-directionally with other devices, such as the BSs 105 and 1100. The modem subsystem 1012 may be configured to modulate and/or encode the data from the memory 1004 and the multi-SIM module 1008 according to a modulation and coding scheme (MCS), e.g., a low-density parity check (LDPC) coding scheme, a turbo coding scheme, a convolutional coding scheme, a digital beamforming scheme, etc. The RF unit 1014 may be configured to process (e.g., perform analog to digital conversion or digital to analog conversion, etc.) modulated/encoded data (e.g., PUSCH data, PUCCH UCI, MSG1, MSG3, etc.) or of transmissions originating from another source such as a UE 115, a BS 105, or an anchor. The RF unit 1014 may be further configured to perform analog beamforming in conjunction with digital beamforming. Although shown as integrated together in transceiver 1010, the modem subsystem 1012 and the RF unit 1014 may be separate devices that are coupled together at the UE 1000 to enable the UE 1000 to communicate with other devices.

The RF unit 1014 may provide the modulated and/or processed data, e.g. data packets (or, more generally, data messages that may contain one or more data packets and other information), to the antennas 1016 for transmission to one or more other devices. The antennas 1016 may further receive data messages transmitted from other devices. The antennas 1016 may provide the received data messages for processing and/or demodulation at the transceiver 1010. The transceiver 1010 may provide the demodulated and decoded data (e.g., RRC configurations, MIB. PDSCH data and/or PDCCH DCIs, etc.) to the multi-SIM module 1008 for processing. The antennas 1016 may include multiple antennas of similar or different designs in order to sustain multiple transmission links.

In an aspect, the UE 1000 can include multiple transceivers 1010 implementing different RATs (e.g., NR and LTE). In an aspect, the UE 1000 can include a single transceiver 1010 implementing multiple RATs (e.g., NR and LTE). In an aspect, the transceiver 1010 can include various components, where different combinations of components can implement different RATs.

Figure 11:
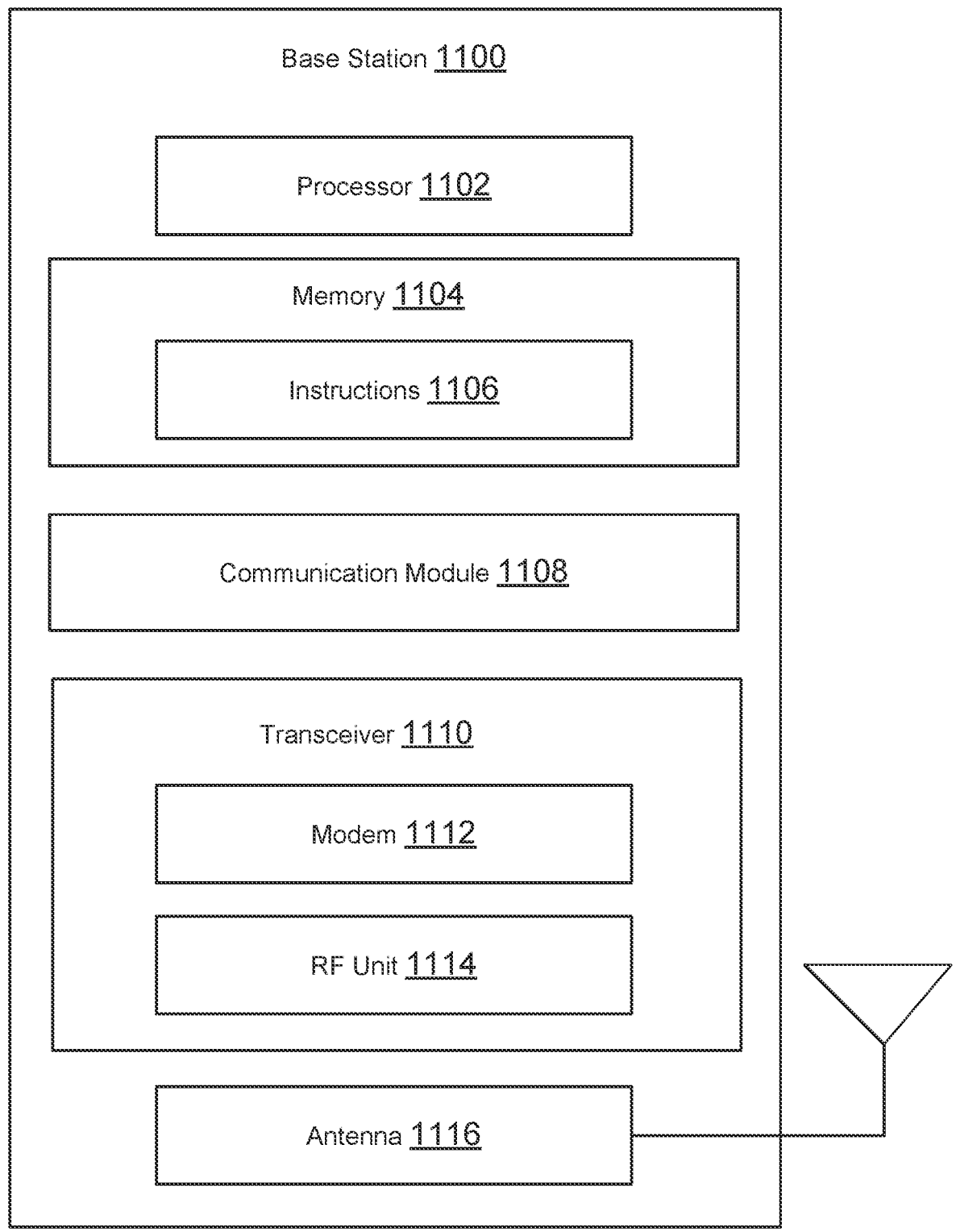
FIG. 11 illustrates a block diagram of an example base station (BS) according to some aspects of the present disclosure.

FIG. 11 is a block diagram of an exemplary BS 1100 according to some aspects of the present disclosure. The BS 1100 may be a BS 105 or a BS 205 as discussed in FIGS. 1 and 2. As shown, the BS 1100 may include a processor 1102, a memory 1104, a communication module 1108, a transceiver 1110 including a modem subsystem 1112 and a RF unit 1114, and one or more antennas 1116. These elements may be coupled with one another. The term "coupled" may refer to directly or indirectly coupled or connected to one or more intervening elements. For instance, these elements may be in direct or indirect communication with each other, for example via one or more buses.

The processor 1102 may have various features as a specific-type processor. For example, these may include a CPU, a DSP, an ASIC, a controller, a FPGA device, another hardware device, a firmware device, or any combination thereof configured to perform the operations described herein. The processor 1102 may also be implemented as a combination of computing devices, e.g., a combination of a DSP and a microprocessor, a plurality of microprocessors, one or more microprocessors in conjunction with a DSP core, or any other such configuration.

The memory 1104 may include a cache memory (e.g., a cache memory of the processor 1102), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 1104 may include a non-transitory computer-readable medium. The memory 1104 may store instructions 1106. The instructions 1106 may include instructions that, when executed by the processor 1102, cause the processor 1102 to perform operations described herein, for example, aspects of FIGS. 1 and 2. Instructions 1106 may also be referred to as program code. The program code may be for causing a wireless communication device to perform these operations, for example by causing one or more processors (such as processor 1102) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1108 may be implemented via hardware, software, or combinations thereof. For example, the communication module 1108 may be implemented as a processor, circuit, and/or instructions 1106 stored in the memory 1104 and executed by the processor 1102. In some examples, the communication module 1108 can be integrated within the modem subsystem 1112. For example, the communication module 1108 can be implemented by a combination of software components (e.g., executed by a DSP or a general processor) and hardware components (e.g., logic gates and circuitry) within modem subsystem 1112. The communication module 1108 may communicate with one or more components of BS 1100 to implement various aspects of the present disclosure, for example, aspects of FIGS. 1 and 2.

As shown, the transceiver 1110 may include the modem subsystem 1112 and the RF unit 1114. The transceiver 1110 can be configured to communicate bi-directionally with other devices, such as the UEs 115, 215 and/or BS 1100 and/or another core network element. The modem subsystem 1112 may be configured to modulate and/or encode data according to a MCS, e.g., a LDPC coding scheme, a turbo coding scheme, a convolutional coding scheme, a digital beamforming scheme, etc. The RF unit 1114 may be configured to process (e.g., perform analog to digital conversion or digital to analog conversion, etc.) modulated/encoded data (e.g., RRC configurations, MIB, PDSCH data and/or PDCCH DCIs, etc.) from the modem subsystem 1112 (on outbound transmissions) or of transmissions originating from another source such as a UE 115, 215, and/or UE 1000. The RF unit 1114 may be further configured to perform analog beamforming in conjunction with the digital beamforming. Although shown as integrated together in transceiver 1110, the modem subsystem 1112 and/or the RF unit 1114 may be separate devices that are coupled together at the BS 1100 to enable the BS 1100 to communicate with other devices.

The RF unit 1114 may provide the modulated and/or processed data, e.g. data packets (or, more generally, data messages that may contain one or more data packets and other information), to the antennas 1116 for transmission to one or more other devices. The antennas 1116 may further receive data messages transmitted from other devices and provide the received data messages for processing and/or demodulation at the transceiver 1110. The transceiver 1110 may provide the demodulated and decoded data (e.g., PUSCH data, PUCCH UCI, MSG1, MSG3, etc.) to the communication module 1108 for processing. The antennas 1116 may include multiple antennas of similar or different designs in order to sustain multiple transmission links.

In an aspect, the BS 1100 can include multiple transceivers 1110 implementing different RATs (e.g., NR and LTE). In an aspect, the BS 1100 can include a single transceiver 1110 implementing multiple RATs (e.g., NR and LTE). In an aspect, the transceiver 1110 can include various components, where different combinations of components can implement different RATs.

Further aspects of the present disclosure include the following clauses:

1. A user equipment (UE) comprising:
   a first subscriber identity module (SIM) associated with a first service provider subscription and a second SIM associated with a second service provider subscription; and
   a processor configured to access the first SIM and the second SIM, wherein the processor is further configured to:
      receiving information indicating a first band for use with the first SIM and a second band for use with the second SIM;
      determining that the first band and the second band are incompatible with demodulation reference signal (DMRS) bundling in a Dual SIM Dual Active (DSDA) operating mode; and
      informing a base station, interacting with the first SIM, that DMRS bundling is unavailable at the UE.

2. The UE of clause 1, wherein the processor is further configured to receive the information indicating the first band from a machine learning algorithm providing a prediction.

3. The UE of clause 1, wherein the processor is further configured to receive the information indicating the first band from the base station.

4. The UE of any of clauses 1-3, wherein the processor is configured to inform the base station that DMRS bundling is unavailable before entering the DSDA operating mode.

5. The UE of any of clauses 1-3, wherein the processor is configured to inform the base station that DMRS bundling is unavailable upon entering the DSDA operating mode.

6. The UE of any of clauses 1-5, wherein the processor is configured to inform the base station that DMRS bundling is unavailable by initiating a tracking area update (TAU) operation and advertising a lack of capability in response to a network re-query.

7. The UE of any of clauses 1-6, wherein the processor is configured to inform the base station that DMRS bundling is unavailable via an information element (IE) in a UE assistance information (UAI) message.

8. The UE of clause 7, wherein the processor is further configured to determine that a subsequent band combination for the first SIM and the second SIM is compatible with DMRS bundling and to inform the base station that DMRS bundling is available via the IE.

9. The UE of any of clauses 1-8, wherein the processor is configured to determine that the first band and the second band are incompatible with DMRS bundling by determining that the first band and the second band are associated with a transmitter tune away from the first SIM to the second SIM.

10. The UE of any of clauses 1-9, wherein the processor is configured to determine that the first band and the second band are incompatible with DMRS bundling by determining that the first band and the second band do not support simultaneous transmission operation within transmit hardware of the UE.

11. The UE of any of clauses 1-10, wherein the processor is configured to determine that the first band and the second band are incompatible with DMRS bundling by determining that the first band and the second band are associated with a transmitter power back off of either the first SIM or the second SIM.

12. A method of wireless communication performed by a user equipment (UE), the method comprising:
   operating in a Dual SIM Dual Active (DSDA) mode with respect to a first subscriber identity module (SIM) and a second SIM;
   controlling transmit operations of the first SIM and the second SIM according to a time division multiplexed (TDM) priority pattern;
   performing demodulation reference signal (DMRS) bundling on the first SIM, the first SIM having a higher priority state according to the TDM priority pattern; and
   deferring a priority switch to give the higher priority state to the second SIM until after the first SIM has completed a repetition of DMRS bundling.

13. The method of clause 12, wherein the first SIM and the second SIM share transmission hardware resources of the UE, wherein the first SIM transmits according to a first band and the second SIM transmits according to a second band that is incompatible with simultaneous operation by the transmission hardware resources.

14. The method of any of clauses 12-13, wherein the first SIM transmits according to a first band, and wherein the second SIM receives according to a second band, and further wherein a combination of the first band and the second band is associated with a backoff of transmit power of the first SIM.

15. The method of any of clauses 12-14, wherein the first SIM transmits according to a first band, and wherein the second SIM receives according to a second band, and further wherein a combination of the first band and the second band is associated with a blank receive operation of the second SIM.

16. The method of any of clauses 12-15, further comprising:
   performing the priority switch to give the higher priority state to the second SIM; and
   adding time to the higher priority state as applied to the second SIM in compensation for deferring the priority switch.

17. The method of any of clauses 12-16, further comprising:
   performing a subsequent priority switch to give the higher priority state to the second SIM in response to the first SIM having completed less than a threshold amount of a DMRS bundling repetition.

18. A non-transitory computer-readable medium having program code recorded thereon for wireless communication by a user equipment (UE), the program code comprising:
  code for operating in a Dual SIM Dual Active (DSDA) mode with respect to a first subscriber identity module (SIM) and a second SIM;
  code for controlling transmit operations of the first SIM and the second SIM according to a time division multiplexed (TDM) priority pattern;
  code for performing demodulation reference signal (DMRS) bundling on the first SIM, the first SIM having a higher priority state according to the TDM priority pattern; and
  code for switching the higher priority state to the second SIM during the DMRS bundling on the first SIM; and
  code for reducing a transmit power of the first SIM during the DMRS bundling on the first SIM, including maintaining phase continuity of the first SIM.

19. The non-transitory computer-readable medium of clause 18, further comprising: code for scaling a filter output in baseband, associated with the first SIM, wherein scaling the filter output includes compensating a phase of operation of the first SIM in accordance with reducing the transmit power.

20. The non-transitory computer-readable medium of any of clauses 18-19, further comprising:
  code for lowering a power amplifier state to reduce the transmit power; and
  code for compensating a phase of operation of the first SIM in accordance with lowering the power amplifier state.

21. A user equipment (UE) comprising:
  means for receiving information indicating a first band for use with a first subscriber identity module (SIM) and a second band for use with a second SIM;
  means for determining that the first band and the second band are incompatible with demodulation reference signal (DMRS) bundling in a Dual SIM Dual Active (DSDA) operating mode; and
  means for taking an action with respect to DMRS bundling in response to determining that the first band and the second band are incompatible with DMRS bundling, including either one or both of: means for advertising a lack of capability for DMRS bundling and means for requesting that DMRS bundling be disabled.

22. The UE of clause 21, further comprising means for determining that that the first band and the second band are associated with a transmitter tune away from the first SIM to the second SIM.

23. The UE of any of clauses 21-22, further comprising means for determining that the first band and the second band do not support simultaneous transmission operation within transmit hardware of the UE.

24. The UE of any of clauses 21-23, further comprising means for determining that the first band and the second band are associated with a transmitter power back off of either the first SIM or the second SIM.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:
1. A user equipment (UE) comprising:
  a first subscriber identity module (SIM) associated with a first service provider subscription and a second SIM associated with a second service provider subscription; and
  a processor configured to access the first SIM and the second SIM, wherein the processor is further configured to:
  operate in a Dual SIM Dual Active (DSDA) mode with respect to the first SIM and the second SIM;
  control transmit operations of the first SIM and the second SIM according to a time division multiplexed (TDM) priority pattern;
  perform demodulation reference signal (DMRS) bundling on the first SIM, the first SIM having a higher priority state according to the TDM priority pattern; and
  switch the higher priority state to the second SIM during the DMRS bundling on the first SIM;
  reduce a transmit power of the first SIM during the DMRS bundling on the first SIM, including maintaining phase continuity of the first SIM;
  scale a filter output in baseband, associated with the first SIM, wherein scaling the filter output includes compensating a phase of operation of the first SIM in accordance with reducing the transmit power;
  lower a power amplifier state to reduce the transmit power;
  compensate a phase of operation of the first SIM in accordance with lowering the power amplifier state;

receiving information indicating a first band for use with the first SIM and a second band for use with the second SIM;

determining that the first band and the second band are incompatible with demodulation reference signal (DMRS) bundling in a Dual SIM Dual Active (DSDA) operating mode; and informing a base station that DMRS bundling is unavailable at the UE.

2. The UE of claim 1, wherein the processor is further configured to receive the information indicating the first band from a machine learning algorithm providing a prediction.

3. The UE of claim 1, wherein the processor is further configured to receive the information indicating the first band from the base station.

4. The UE of claim 1, wherein the processor is configured to inform the base station that DMRS bundling is unavailable before entering the DSDA operating mode.

5. The UE of claim 1, wherein the processor is configured to inform the base station that DMRS bundling is unavailable upon entering the DSDA operating mode.

6. The UE of claim 1, wherein the processor is configured to inform the base station that DMRS bundling is unavailable by initiating a tracking area update (TAU) operation and advertising a lack of capability in response to a network re-query.

7. The UE of claim 1, wherein the processor is configured to inform the base station that DMRS bundling is unavailable via an information element (IE) in a UE assistance information (UAI) message.

8. The UE of claim 7, wherein the processor is further configured to determine that a subsequent band combination for the first SIM and the second SIM is compatible with DMRS bundling and to inform the base station that DMRS bundling is available via the IE.

9. The UE of claim 1, wherein the processor is configured to determine that the first band and the second band are incompatible with DMRS bundling by determining that the first band and the second band are associated with a transmitter tune away from the first SIM to the second SIM.

10. The UE of claim 1, wherein the processor is configured to determine that the first band and the second band are incompatible with DMRS bundling by determining that the first band and the second band do not support simultaneous transmission operation within transmit hardware of the UE.

11. The UE of claim 1, wherein the processor is configured to determine that the first band and the second band are incompatible with DMRS bundling by determining that the first band and the second band are associated with a transmitter power back off of either the first SIM or the second SIM.

12. A method of wireless communication performed by a user equipment (UE), the method comprising:

operating in a Dual SIM Dual Active (DSDA) mode with respect to a first subscriber identity module (SIM) and a second SIM;

controlling transmit operations of the first SIM and the second SIM according to a time division multiplexed (TDM) priority pattern;

performing demodulation reference signal (DMRS) bundling on the first SIM, the first SIM having a higher priority state according to the TDM priority pattern;

switching the higher priority state to the second SIM during the DMRS bundling on the first SIM;

reducing a transmit power of the first SIM during the DMRS bundling on the first SIM, including maintaining phase continuity of the first SIM;

scaling a filter output in baseband, associated with the first SIM, wherein scaling the filter output includes compensating a phase of operation of the first SIM in accordance with reducing the transmit power;

lowering a power amplifier state to reduce the transmit power;

compensating a phase of operation of the first SIM in accordance with lowering the power amplifier state; and deferring a priority switch to give the higher priority state to the second SIM until after the first SIM has completed a repetition of DMRS bundling.

13. The method of claim 12, wherein the first SIM and the second SIM share transmission hardware resources of the UE, wherein the first SIM transmits according to a first band and the second SIM transmits according to a second band that is incompatible with simultaneous operation by the transmission hardware resources.

14. The method of claim 12, wherein the first SIM transmits according to a first band, and wherein the second SIM receives according to a second band, and further wherein a combination of the first band and the second band is associated with a backoff of transmit power of the first SIM.

15. The method of claim 12, wherein the first SIM transmits according to a first band, and wherein the second SIM receives according to a second band, and further wherein a combination of the first band and the second band is associated with a blank receive operation of the second SIM.

16. The method of claim 12, further comprising:
performing the priority switch to give the higher priority state to the second SIM; and
adding time to the higher priority state as applied to the second SIM in compensation for deferring the priority switch.

17. The method of claim 12, further comprising:
performing a subsequent priority switch to give the higher priority state to the second SIM in response to the first SIM having completed less than a threshold amount of a DMRS bundling repetition.

* * * * *